(12) United States Patent
Chien et al.

(10) Patent No.: US 12,093,191 B2
(45) Date of Patent: Sep. 17, 2024

(54) METHOD FOR EVOLVING ROOT OF TRUST AND ELECTRONIC DEVICE USING THE SAME

(71) Applicant: NUVOTON TECHNOLOGY CORPORATION, Hsinchu (TW)

(72) Inventors: Lung-Chih Chien, Hsinchu (TW); Mu-Lin Chao, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 247 days.

(21) Appl. No.: 17/893,891

(22) Filed: Aug. 23, 2022

(65) Prior Publication Data

US 2023/0072351 A1    Mar. 9, 2023

(30) Foreign Application Priority Data

Sep. 6, 2021   (TW) .................. 110132959

(51) Int. Cl.
*H04L 9/32*     (2006.01)
*G06F 12/14*    (2006.01)

(52) U.S. Cl.
CPC ........ *G06F 12/1425* (2013.01); *H04L 9/3234* (2013.01)

(58) Field of Classification Search
None
See application file for complete search history.

(56) References Cited

U.S. PATENT DOCUMENTS

| | | | |
|---|---|---|---|
| 6,948,041 B2 * | 9/2005 | Chevallier | G06F 12/1433 235/382 |
| 9,858,229 B2 * | 1/2018 | Balasubramanian | G06F 13/404 |
| 2016/0092701 A1 * | 3/2016 | Shah | H04W 4/60 713/189 |

* cited by examiner

*Primary Examiner* — Fatoumata Traore
(74) *Attorney, Agent, or Firm* — MUNCY, GEISSLER, OLDS & LOWE, P.C.

(57) ABSTRACT

The embodiment of the present disclosure provides a method for evolving a root of trust and an electronic device using the method. Through the present disclosure, the root of trust can be evolved several times to strengthen the security verification capability for secure boot. Different from the conventional method of burning the root of trust in the read-only memory, the present disclosure uses a block protection storage device to write a verification firmware to be added to the root of trust into an unprotected block of the block protection storage device. Further, after the writing is completed, the unprotected block in which the verification firmware is written becomes a protected block, so as to make the evolvable root of trust secure and reliable, and can achieve credibility for evolving the root of trust.

10 Claims, 6 Drawing Sheets

METHOD FOR EVOLVING ROOT OF TRUST AND ELECTRONIC DEVICE USING THE SAME

CROSS-REFERENCE TO RELATED APPLICATION

This application claims the priority from the TW Patent Application No. 110132959, filed on Sep. 6, 2021, and all contents of such TW Patent Application are included in the present disclosure.

BACKGROUND

1. Field of the Invention

The present disclosure relates to a root of trust technology in the security field, in particular to, a method for evolving the root of trust and an electronic device using the method.

2. Description of the Related Art

At the present day, in computer information systems, the security of protection system is a very important issue. For example, how to ensure the integrity of the system, how to detect whether the system is contaminated, how to rescue the contaminated system, and how to back up important system information, etc., the above actions must rely on a completely trustworthy root of trust. The root of trust is designed as a reliable verification firmware at the bottom of a chain of trust in a series of verification processes, so the integrity cannot be confirmed. Based on the requirements of security, the root of trust is burned in a read-only memory (ROM) in the prior arts. However, the method of replacing the root of trust by remanufacturing the read-only memory means that the mask must be redesigned, which increases the manufacturing cost and time cost.

SUMMARY

According to the purpose of the present disclosure, an embodiment of the present disclosure provides a method for evolving a root of trust applied to a block protection storage device. The block protection storage device has block protection fuse bits comprising a first block protection fuse bit and a second protection fuse bit, block protection bits comprising a first block protection bit and a second block protection bit, and blocks comprising a first block and a second block. The method comprises steps as follows. Firstly, first verification firmware is written in the first block under a condition that the first block protection fuse bit and the first block protection bit corresponding to the first block are set to false. Next, the first block protection fuse bit and the first block protection bit are set to true, so as to protect the first block from being written. Then, a first verification information is written in the second block under a condition that the second block protection fuse bit and the second block protection bit corresponding to the second block are set to false, wherein the first verification information and the first verification firmware are configured to verify user firmware, and the first verification information is encrypted based on an encryption algorithm of the first verification firmware. Then, the second block protection bit is set to true.

In addition, according to the purpose of the present disclosure, an embodiment of the present disclosure provides an electronic device for executing the above-mentioned method for evolving the root of trust.

Alternatively, a security verification chip of the electronic device is packaged together with a functional chip of the electronic device through a multi-chip package.

In conclusion, the embodiments of the present disclosure provide the method for evolving the root of trust and the electronic device using the method. Through the proposed solutions of the present disclosure, the root of trust can be evolved several times to strengthen the security verification capability for secure boot.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate demonstrated embodiments of the present disclosure, and are used to explain the principal of the present disclosure together with the description of the present disclosure.

DESCRIPTION OF THE PREFERRED EMBODIMENTS

The embodiments of the present disclosure are described in detail as reference, and the drawings of the present disclosure are illustrated. In the case of possibility, the element symbols are used in the drawings to refer to the same or similar components. In addition, the embodiment is only one approach of the implementation of the design concept of the present disclosure, and the following multiple embodiments are not intended to limit the present disclosure.

An embodiment of the present disclosure provides a method for evolving a root of trust applied to a block protection storage device. The block protection storage device has block protection fuse bits comprising a first block protection fuse bit and a second protection fuse bit, block protection bits comprising a first block protection bit and a second block protection bit, and blocks comprising a first block and a second block. After a verification firmware other than an original verification firmware of the root of trust is written in an unprotected block in the block protection storage device, the first block protection fuse bit and the first block protection bit are both set to true to protect the first block from being written, so as to make the written verification firmware be served as a part of the root of trust. The first block in which the verification firmware is written is a protected block which the first block protection fuse bit and the first block protection bit of the block are both set to true. Therefore, the written verification firmware can no longer be rewritten, so that the root of trust is still safe and reliable after the root of trust is upgraded. Additionally, an encryption algorithm of the written verification firmware can be used to encrypt user firmware information to be authenticated by the root of trust, and the encrypted user firmware information can be a header to be written in an unprotected block next to the first block in which the verification firmware is written. The user firmware information comprises an indication or size of the user firmware, which can be served as the basis for subsequent user firmware integrity verification after the user firmware information is encrypted.

Although the above method is to encrypt the user firmware information as the header, the present disclosure is not limited thereto. The user firmware information can also be served as a tailer after encryption, or placed in other locations, but the premise is that the aforementioned verification firmware written to the block protection storage device and the original verification firmware of the root of trust must be specifically designed, so as to make the encrypted user firmware information be grabbed at specific location. After verifying the user firmware, the original verification firmware of the root of trust can know how to execute the user firmware. Furthermore, in addition to the indication and size of the user firmware information that will be encrypted and configured to authenticate, a part of the user firmware can also or other information related to the user firmware can be encrypted, and the present disclosure is not limited thereto. Simply speaking, the above-mentioned encrypted information is served as the verification information of the user firmware, and can be the header, the tailer, or stored in other locations (not necessarily immediately after the written verification firmware).

Further, the first block of the block protection storage device corresponds to the first block protection fuse bit and the first block protection bit. When the first block protection bit is set to true, the first block cannot be written. Only when the first block protection bit is set to false, the first block can be written. When the second block protection fuse bit corresponding to the second block is false, the second block protection bit can be set to either false or true, but when the second block protection fuse bit is true, the second block protection bit is no longer allowed to be set from true to false or from false to true. Each of the block protection fuse bit is a one-time programmable bit. When the second block protection fuse bit is changed from false to true, the second block protection fuse bit is no longer allowed to be changed from true to false.

In the present disclosure, the original verification firmware of the root of trust is written in the protected block or a read-only memory when the product leaves the factory, so that it cannot be deleted or changed. In the present disclosure, after the verification firmware other than the original verification firmware is written in the unprotected block, the first block protection fuse bit and the first block protection bit are both set to true, and the first block from being written. After the original verification firmware of the root of trust is executed, the verification firmware written in the first block is executed. Therefore, the verification firmware written in the protected block can be regarded as part of the root of trust, so the root of trust can be evolved through the method of the present disclosure. Besides, since the verification firmware in the protected block is not allowed to be deleted or changed, the upgraded and evolved root of trust is still safe and trustworthy.

Figure 1:
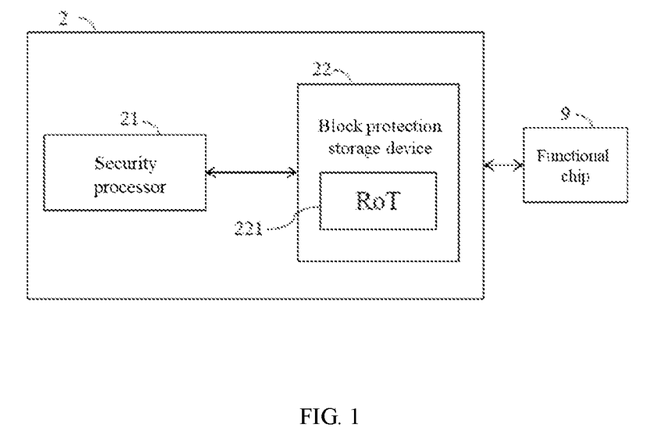
FIG. 1 is a schematic block diagram of an electronic device with an evolvable root of trust according to an embodiment of the present disclosure.

After explaining the basic concept of the present disclosure, the details of the present disclosure are further explained. Referring to FIG. 1, FIG. 1 is a block diagram of an electronic device with an evolvable root of trust according to an embodiment of the present disclosure. The electronic device comprises a security verification chip 2 and a functional chip 9, wherein the security verification chip 2 is electrically connected to the functional chip 9. The security verification chip 2 comprises a security processor 21 and a block protection storage device 22, and the block protection storage device 22 stores a root of trust 221. The security verification chip 2 is packaged together with the functional chip 9 through a multi-chip package (MCP). In an embodiment, the functional chip 9 can only access the block protection storage device 22 through the security processor 21 of the security verification chip 2. In another embodiment, if higher standards of security are not considered, the security verification chip 2 and the functional chip 9 are not packaged together through the multi-chip package. Moreover, the block protection storage device 22 of the security verification chip 2 can be removed from the security verification chip 2 to allow the security verification chip 2 and the functional chip 9 to be accessed through a bus.

Figure 2:
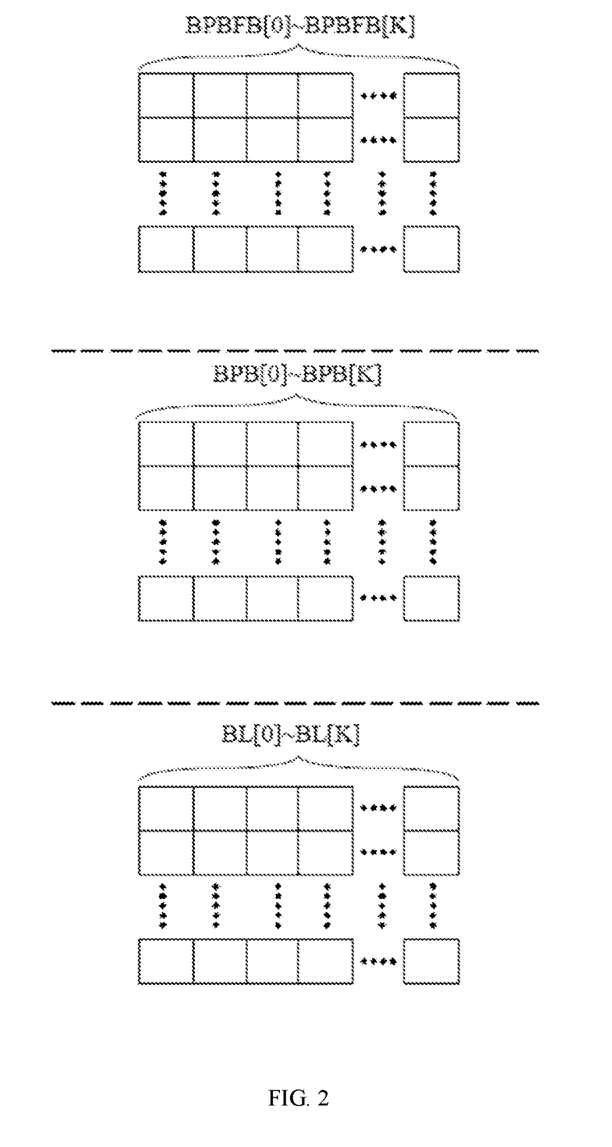
FIG. 2 is a schematic diagram of the relationship between a block, a block protection fuse bit and a block protection fuse bit of a block protection storage device of an electronic device according to an embodiment of the present disclosure.

Referring to FIG. 1 and FIG. 2 at the same time, FIG. 2 is a schematic diagram of the relationship between a block, a block protection bit and a block protection fuse bit of a block protection storage device of an electronic device according to an embodiment of the present disclosure. The block protection storage device 21 has a plurality of blocks. For example, the first row has K+1 blocks BL[0] through BL[K], and each block has a corresponding block protection fuse bit and block protection bit. For example, K+1 the blocks BL[0] through BL[K] respectively correspond to the block protection bits BPB[0] through BPB[K], and respectively correspond to the block protection fuse bits BPBFB[0] through BPBFB[K].

When the block protection bit is set to true, the corresponding block cannot be written. Only when the block protection bit is set to false, the corresponding block is allowed to be written. For example, if the block protection bit BPB[0] of the block BL[0] is false, the block BL[0] is allowed to be written. The block protection fuse bit is the one-time programmable bit. Hence, when the fuse is fused and changed from false to true, the block protection fuse bit cannot be changed to false again. Moreover, the block protection bit is allowed to be set from false to true or from true to false only when the corresponding block protection fuse bit is false. For example, the block protection bit BPB[1] can be set from false to true or from true to false when the block protection fuse bit BPBFB[1] is false.

Furthermore, when the block protection bit and the block protection fuse bit are both true, the corresponding block is the protected block. Otherwise, as long as the block protection fuse bit is false, the corresponding block is the unprotected block. For example, when the block protection fuse bit BPBFB[1] is false, but the block protection bit BPB[1] can be true, the block BL[1] is the unprotected block. The block protection bit BPB[1] is set to true just to prevent the block BL[1] from being written by mistake, and the block protection bit BPB[1] can still be changed to false. For the reason that the block BL[1] is not classified as the protected block in such condition.

Next, referring to FIG. 1 continuously, when the electronic devices leave the factory, the original verification firmware of the root of trust 221 is written in the protected block of the block protection storage device 22. Alternatively, in another example, the original verification firmware of the root of trust may be written in the read-only memory (not shown in drawings) of the security verification chip 2 or the block protection storage device 22. To further evolve the root of trust 221, a new verification firmware can be written in the unprotected block of the block protection storage device 22 as part of the root of trust 221. After writing the new verification firmware in the unprotected block, the unprotected block will become the protected block through setting the corresponding block protection fuse bit and block protection bit to true.

Figure 3A:
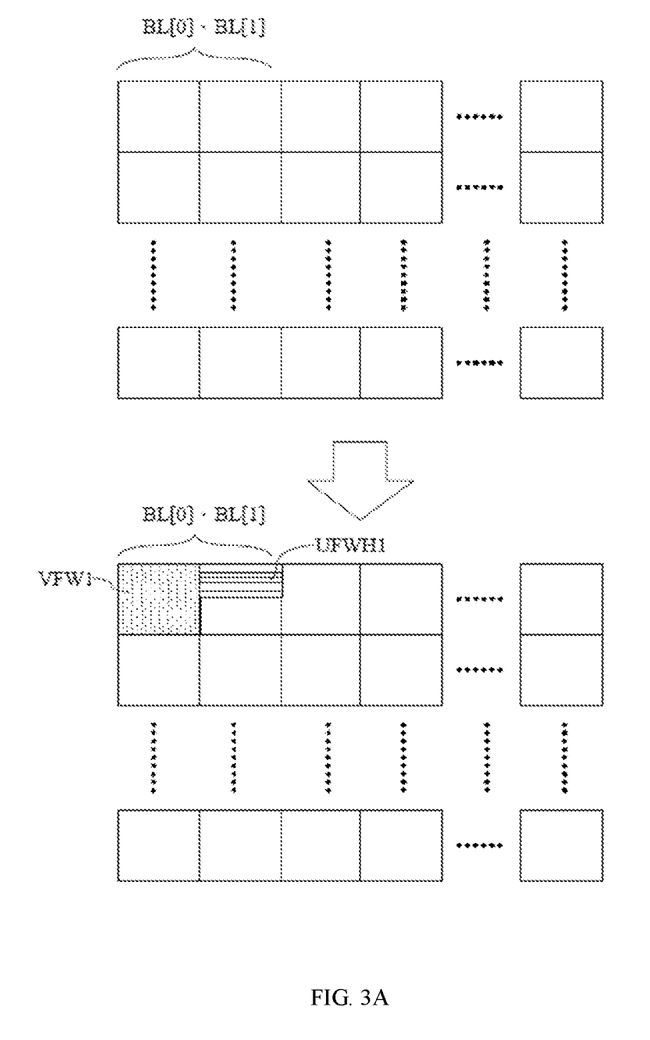
FIG. 3A is a schematic diagram of the first evolution of the root of trust of the electronic device according to an embodiment of the present disclosure.

Referring to FIG. 1 and FIG. 3A, FIG. 3A is a schematic diagram of the first evolution of the root of trust of the electronic device according to an embodiment of the present disclosure. In the upper part of FIG. 3A, the root of trust 221 only has the original verification firmware, and this original verification firmware may not have any secure boot capability. When executing this original verification firmware, merely the user firmware of the block protection storage device 22 is read out for executing, but it does not perform security verification. In order to increase the security verification capability, the verification firmware VFW1 (for example, the verification firmware based on CRC32 for security verification) can be obtained through the security processor 21 of the security verification chip 2. The block protection bits BPB[0] and BPB[1] of the unprotected block BL[0] and BL[1] of the block protection storage device 22 are set from true to false (it is also possible that the block protection bits BPB[0] and BPB[1] are false initially, and there is no such action) to write the verification firmware VFW1 into the block BL[0], and write the verification information UFWH1 in the block BL[1]. Besides, the verification information UFWH1 comprises the information to be configured to verify the user firmware, which is encrypted based on an encryption algorithm of the verification firmware VFW1, such as an integrity value of the indication and size of the user firmware encrypted based on CRC32. In this way, the verification firmware VFW1 can calculate the integrity value of the user firmware and compare the integrity value included in the verification information UFWH1 to achieve the effect of security verification.

After the verification firmware VFW1 is written in the block BL[0], the security processor 21 will set the block protection fuse bit BPBFB[0] of the block protection storage device 22 from false to true, so that the block BL[0] is changed from the unprotected block to the protected block. After the verification information UFWH1 is written in the block BL[1], the security processor 21 will set the block protection bit BPB[1] of the block protection storage device 22 from false to true, but the block protection fuse bit BPBFB[1] is still false. As a result, the block BL[1] is still the unprotected block, but it can prevent others from writing the verification information UFWH1 by mistake.

In this way, in an embodiment of the present disclosure, in addition to the original verification firmware, the root of trust 221 has, for example, the verification firmware VFW1 based on CRC32. When the root of trust is executed, the verification firmware VFW1 will poll each user firmware to verify. In order to accelerate the verification speed, the security verification chip 2 may further have a hardware acceleration circuit. Moreover, it should be noted that if the size of the verification firmware VFW1 exceeds the capacity of one block, it can be written in several blocks. Similarly, if the size of the verification information UFWH1 exceeds the capacity of one block, it can be written in several blocks. Furthermore, the verification firmware is usually not too large, about a few thousand bits, so it does not take too much time to read the verification firmware, and the verification firmware VFW1 does not occupy too many blocks. Therefore, the design does not need to use the block protection storage device 22 with a large storage capacity, and the root of trust 221 can be evolved several times.

Figure 3B:
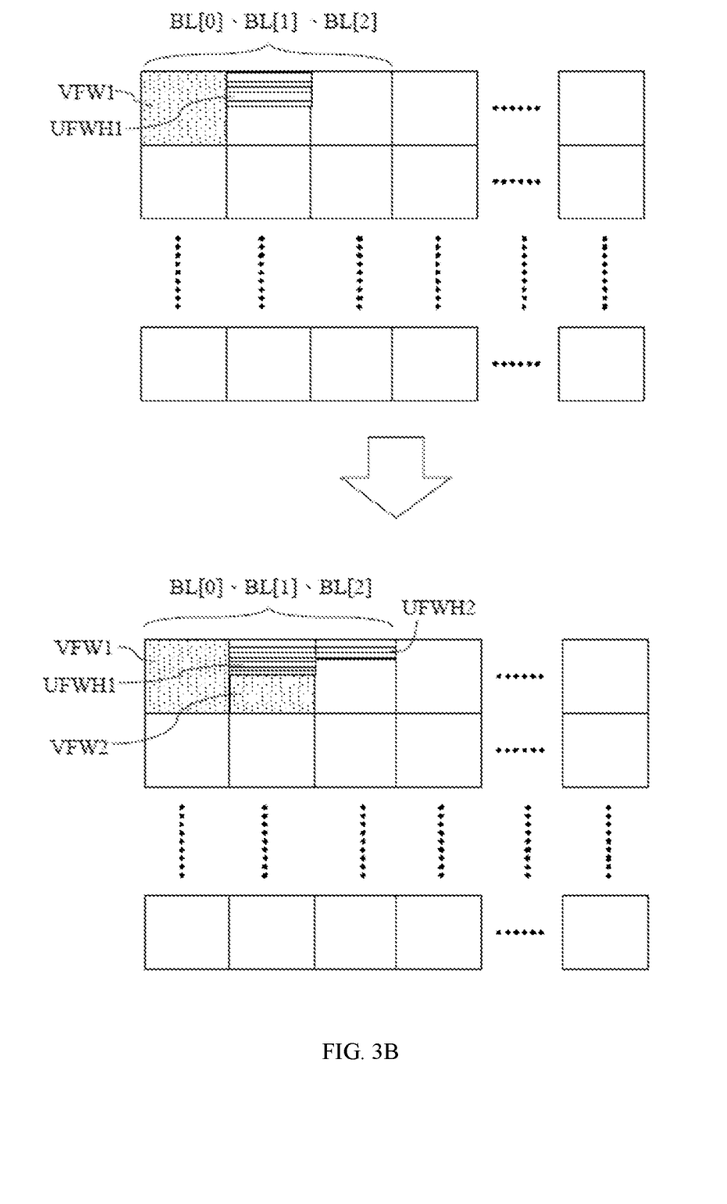
FIG. 3B is schematic diagram of the second evolution of the root of trust of the electronic device according to an embodiment of the present disclosure.

Referring to FIG. 1 and FIG. 3B, FIG. 3B is schematic diagram of the second evolution of the root of trust of the electronic device according to an embodiment of the present disclosure. When it is felt that the security verification capability of CRC32 is still insufficient, the root of trust 221 can be evolved to have a higher security verification capability, such as SHA256. The security processor 21 of the security verification chip 2 will obtain the verification firmware VFW2 (for example, the verification firmware based on SHA256 for security verification), and the block protection bits BPB[1] and BPB[2] of the unprotected blocks BL[1] and BL[2] of the block protection storage device 22 are set from true to false (it is also possible that the block protection bits BPB[1] and BPB[2] are false initially, and there is no such setting action) to write the verification firmware VFW2 in the block BL[1], and write the verification information UFWH2 in the block BL[2]. Besides, the verification information UFWH2 comprises the information to be configured to verify the user firmware, which is encrypted based on an encryption algorithm of the verification firmware VFW2, such as an integrity value of the user firmware indication and size based on SHA256 encryption.

After verification firmware VFW2 is written in the block BL[1], the security processor 21 will set the block protection fuse bit BPBFB[1] of the block protection storage device 22 from false to true, so that the block BL[1] is changed from the unprotected block to the protected block. After the verification information UFWH2 is written in the block BL[2], the security processor 21 will set the block protection bit BPB[2] of the block protection storage device 22 from false to true, but the block protection fuse bit BPBFB[2] is still false. Therefore, the block BL[2] is still the unprotected block, but it can prevent others from writing the verification information UFWH2 by mistake. In this embodiment, after the original verification firmware of the root of trust is executed, the verification firmware, VFW1 and VFW2 can be executed in sequence to verify the user firmware respectively. However, in other embodiments of the present disclosure, it can also be designed that after the original verification firmware of the root of trust is executed, only the verification firmware VFW2 is executed to verify the user firmware, but the execution of the verification firmware VFW1 is skipped.

Figure 3C:
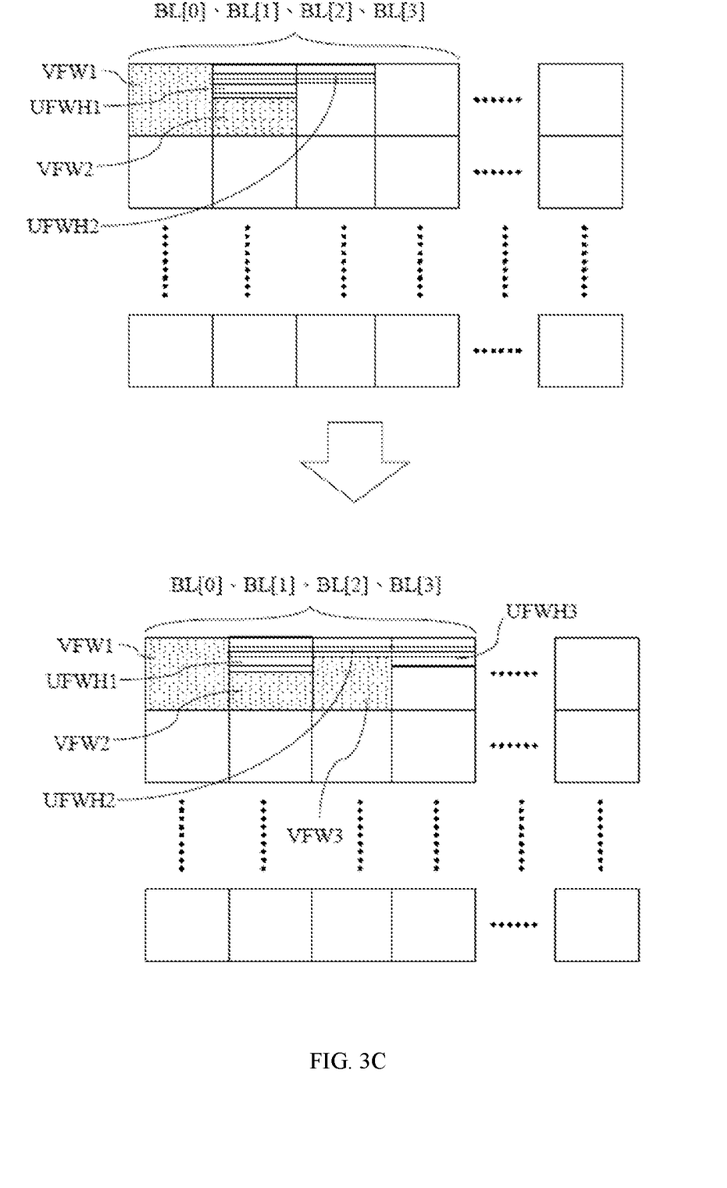
FIG. 3C is schematic diagram of the third evolution of the root trust of the electronic device of an embodiment of the present disclosure.

Referring to FIG. 1 and FIG. 3C, FIG. 3C is schematic diagram of the third evolution of the root trust of the electronic device of an embodiment of the present disclosure. When it is felt that the security verification capability of SHA 256 is still insufficient, the root of trust 221 can be evolved to have a higher security verification capability, such as ECDSA. The security processor 21 of the security verification chip 2 will obtain the verification firmware VFW3 (for example, the verification firmware based on ECDSA for security verification), and the block protection bits BPB[2] and BPB[3] of the unprotected block BL[2] and BL[3] of the block protection storage device 22 are set from true to false (it is also possible that the block protection bits BPB[2] and BPB[3] are false initially, and there is no such setting action) to write the verification firmware VFW3 in the block BL[2], and to write the verification information UFWH3 in the block BL[3]. Besides, the verification information UFWH3 comprises the information to be configured to verify the user firmware, which is encrypted based on an encryption algorithm of the verification firmware VFW3, such as an integrity value of the indication and size of the user firmware based on ECDSA encryption.

After the verification firmware VFW3 is written in the block BL[2], the security processor 21 will set the block protection fuse bit BPBFB[2] of the block protection storage device 22 from false to true, so that the block BL[2] is changed from the unprotected block to the protected block. After the verification information UFWH3 is written in the block BL[3], the security processor 21 will set the block protection bit BPB[3] of the block protection storage device 22 from false to true, but the block protection fuse bit BPBFFB[3] is still false. As a result, the block BL[3] is still the unprotected block, but it can prevent others from writing the verification information UFWH3 by mistake.

Continuing to return to FIG. 1, since the electronic device of FIG. 1 adopts the multi-chip package, the block protection storage device 22 is located inside the chip. Unless the chip is destroyed, the block protection storage device 22 cannot be replaced. Moreover, even if the block protection storage device 22 is replaced by others by destroying the chip, the original verification firmware of the read-only memory (not shown in figures) has a native built-in protection authentication mechanism for protection.

Figure 4:
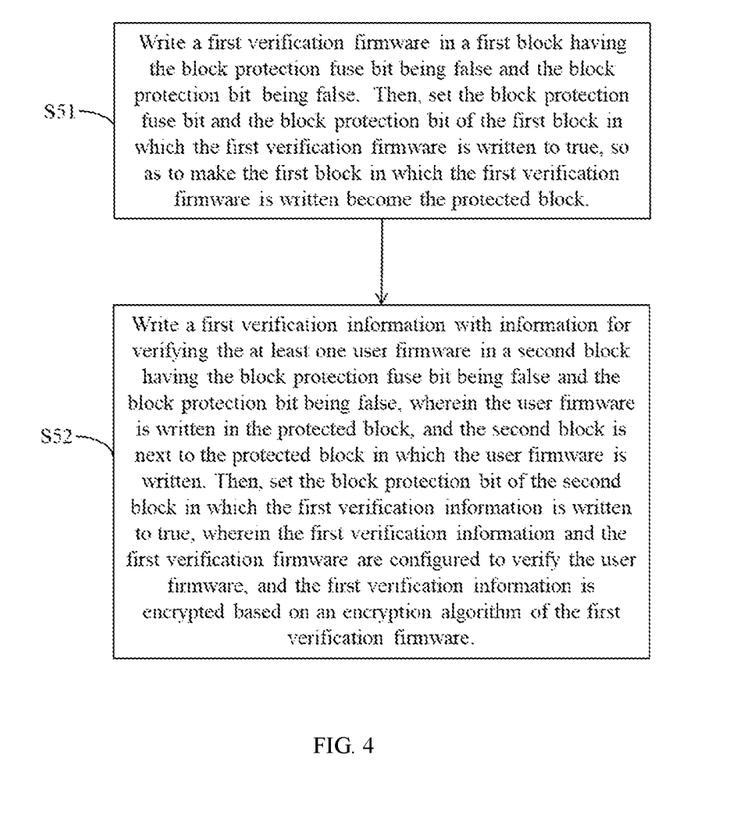
FIG. 4 is a flowchart of a method for evolving the root of trust according to an embodiment of the present disclosure.

Referring to FIG. 4, FIG. 4 is a flowchart of a method for evolving the root of trust according to an embodiment of the present disclosure. FIG. 4 is a flowchart of evolving the root of trust once, but the present disclosure is not based on the times of evolving the root of trust. Firstly, in the step S51, first verification firmware is written in a first block having the block protection fuse bit being false and the block protection bit being false. Then, the block protection fuse bit and the block protection bit of the first block in which the first verification firmware is written are set to true in step S51, so as to make the first block in which the first verification firmware is written become the protected block. In step S52, first verification information with information for verifying that at least one user firmware is written in a second block having the block protection fuse bit being false and the block protection bit being false, wherein the user firmware is written in the protected block, and the second block is next to the protected block in which the user firmware is written. Then, in the step S52, the block protection bit of the second block in which the first verification information is written is set to true, wherein the first verification information and the first verification firmware are configured to verify the user firmware, and the first verification information is encrypted based on an encryption algorithm of the first verification firmware.

As stated above, the embodiments of the present disclosure provide a method for evolving the root of trust and an electronic device using the method. Through the present disclosure, the root of trust can be evolved several times to strengthen the security verification capability of the secure boot. Difference from the conventional method of burning the root of trust in the read-only memory, in the present disclosure, the verification firmware to be added to the root of trust is written in the unprotected block of the block protection storage device. After the writing is completed, the block protection fuse bit and the block protection bit are both set to true, so that the unprotected block in which written the verification firmware becomes a protected block. In this way, the evolved root of trust is safe and reliable, and the purpose of evolving the root of trust can be achieved. Compare with the conventional technology, if the root of trust is to be replaced, a mask must be redesigned to create a new read-only memory. The method of the present disclosure can further reduce the time cost and manufacturing cost of replacing the root of trust, and reduce the risk of remanufacturing. Moreover, the current computer capabilities are rapidly increasing, and increasing the security verification capability of the root of trust may become more frequent. Therefore, compare with the conventional method, the method of the present disclosure is more in line with the needs of the current market. Additionally, if the algorithm has been determined and the related security chip is to be mass-produced, all the other protection fuse bits can be set to true, and the scope of the root of trust and the unprotected block can be fixed to determine the relevance of the root of trust security algorithm to the product. Aside from, the electronic device of the present disclosure can be packaged with multi-chip package. Hence, the block protection storage device is located inside the chip, and unless the chip is destroyed, the block protection storage device cannot be replaced. Further, even if the block protection storage device is replaced by others by destroying the chip, the original verification firmware of the read-only memory (not shown in the drawings) has the native built-in protection verification mechanism for protection.

It should be understood that the examples and the embodiments described herein are for illustrative purpose only, and various modifications or changes in view of them will be suggested to those skilled in the art, and will be included in the spirit and scope of the application and the appendix with the scope of the claims.

What is claimed is:

1. A method for evolving a root of trust, applied to a block protection storage device, wherein the block protection storage device has block protection fuse bits comprising a first block protection fuse bit and a second block protection fuse bit, block protection bits comprising a first block protection bit and a second block protection bit, and blocks comprising a first block and a second block, and the first block corresponds to the first block protection fuse bit and the first block protection bit, the second block corresponds to the second block protection fuse bit and the second block protection bit, wherein each of the block protection fuse bits is a one-time programmable bit, one of the blocks is protected from being written when a corresponding one of the block protection bits is set to true, and one of the block protection bits is protected from being written when a corresponding one of block protection fuse bits is set to true from false, the method comprises:
    writing a first verification firmware in the first block under a condition that the first block protection fuse bit and the first block protection bit corresponding to the first block are set to false;
    setting the first block protection fuse bit and the first protection bit to true, so as to protect the first block from being written;
    writing a first verification information in the second block under a condition that the second block protection fuse bit and the second block protection bit corresponding to the second block are set to false, wherein the first verification information and the first verification firmware are configured to verify user firmware, and the first verification information is encrypted based on an encryption algorithm of the first verification firmware; and
    setting the second block protection bit to true.

2. The method according to claim 1, wherein among the blocks, the second block is located next to the first block, and the first verification information is configured to verify a first header of the user firmware.

3. The method according to claim 1, wherein the blocks further comprise a third block, the block protection fuse bits further comprise a third block protection fuse bit, the block protection bits further comprise a third block protection bit, and the third block corresponds to the third block protection fuse bit and the third block protection bit, the method further comprises:

setting the second block protection bit to false, and writing a second verification firmware in the second block;

setting the second block protection fuse bit and the second block protection bit to true, so as to protect the second block, in which the second verification firmware is written, from being written; and writing the second verification information in the third block under a condition that the third block protection fuse bit and the third block protection bit are set to false, wherein the second verification information and the second verification firmware are configured to verify the user firmware, and the second verification information is encrypted based on an encryption algorithm of the second verification firmware; and setting the third block protection bit corresponding to the third block, in which the second verification information is written, to true.

4. The method according to claim 3, wherein original verification firmware, the first verification firmware and the second verification firmware of the root of trust are executed in sequence to verify the user firmware.

5. The method according to claim 3, wherein original verification firmware and the second verification firmware of the root of trust are executed in sequence to verify the user firmware while execution of the first verification firmware is skipped.

6. The method according to claim 3, wherein a security verification capability of the first verification firmware is higher than a security verification capability of an original verification firmware of the root of trust, and a security verification capacity of the second verification firmware is higher than the security verification capability of the first verification firmware.

7. The method according to claim 3, wherein the first verification information comprises a first integrity value, which is obtained by using the encryption algorithm of the first verification firmware to encrypt an indication and/or size of the user firmware, and the second verification information comprises a second integrity value, which is obtained by using the encryption algorithm of the second verification firmware to encrypt the indication and/or size of the user firmware.

8. An electronic device, comprising
a functional chip; and
a security verification chip, electrically connected to the functional chip and configured to store an original verification firmware of a root of trust, and the security verification chip comprising:
a security processor; and
a block protection storage device, having blocks comprising a first block and a second block, wherein the first block corresponds to the first block protection fuse bit and the first block protection bit, the second block corresponds to the second block protection fuse bit and the second block protection bit, wherein each of the block protection fuse bits is one-time programmable bit, one of the blocks is protected from being written when a corresponding one of the block protection bit is set to true, and one of the block protection bits is protected from being written when a corresponding one of the block protection fuse bits is set to true from false;
wherein the security processor controls the block protection storage device to evolve the root of trust, and the process of evolving the root of trust comprises:
writing first verification firmware in the first block under a condition that the first block protection fuse bit and the first block protection bit corresponding to the first block are set to false;
setting the first block protection fuse bit and the first block protection bit to true, so as to protect the first block from being written;
writing first verification information in the second block under a condition that the second block protection fuse bit and the second block protection bit corresponding to the second block are set to false, wherein the first verification information and the first verification firmware are configured to verify user firmware, and the first verification information is encrypted based on an encryption algorithm of the first verification firmware; and
setting the second block protection bit to true.

9. The electronic device according to claim 8, wherein the original verification firmware of the root of trust is written in at least one protected block of the block protection storage device; or the security verification chip further comprises a read-only memory, and the original verification firmware of the root of trust is burned in the read-only memory.

10. The electronic device according to claim 8, wherein the security verification chip is packaged together with the functional chip through a multi-chip package, and the functional chip accesses the block protection storage device through the security processor of the security verification chip.

* * * * *